Oct. 24, 1967   H. B. CURRIE   3,349,372
FIRST STROKE LOCATOR FOR A CHARACTER READER
Filed July 20, 1964   6 Sheets-Sheet 1
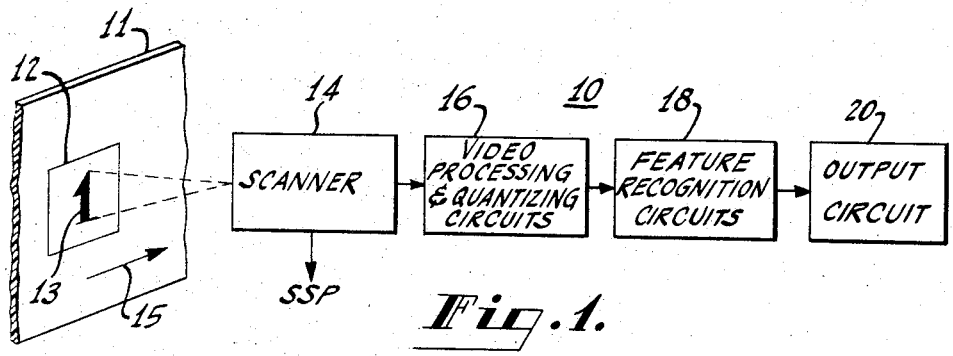
Fig. 1.
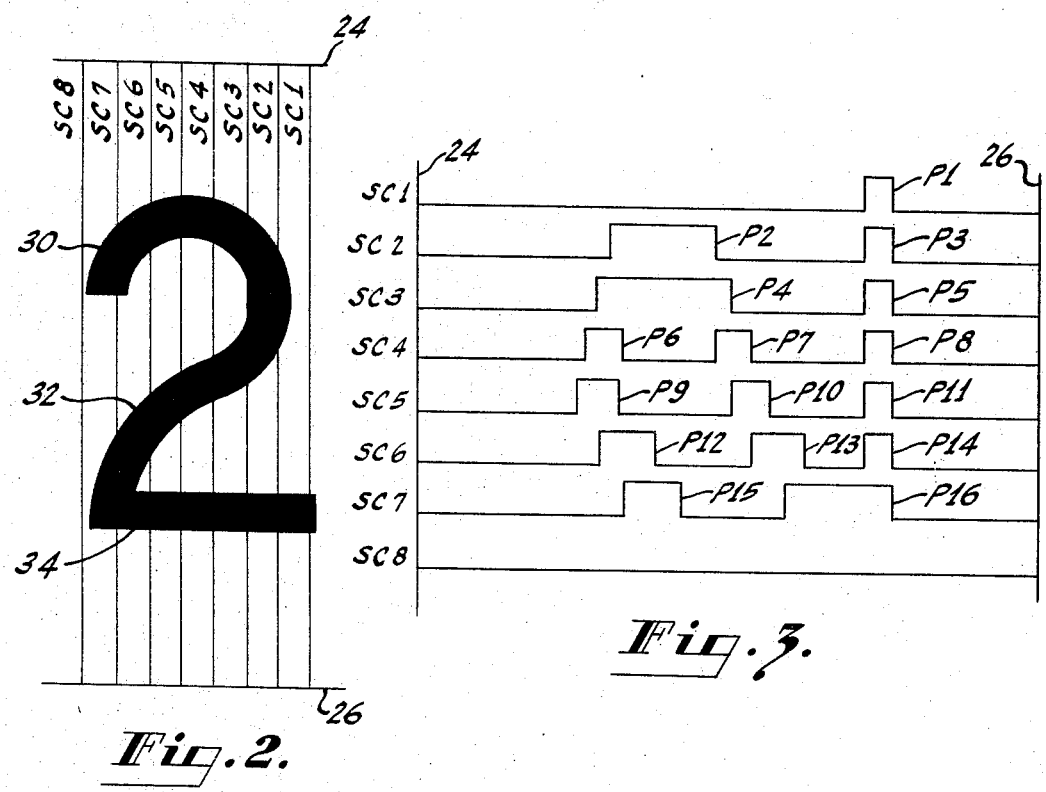
Fig. 2.
Fig. 3.
INVENTOR.
HAROLD B. CURRIE Oct. 24, 1967  H. B. CURRIE  3,349,372
FIRST STROKE LOCATOR FOR A CHARACTER READER
Filed July 20, 1964  6 Sheets-Sheet 2

INVENTOR.
HAROLD B. CURRIE

INVENTOR.
HAROLD B. CURRIE

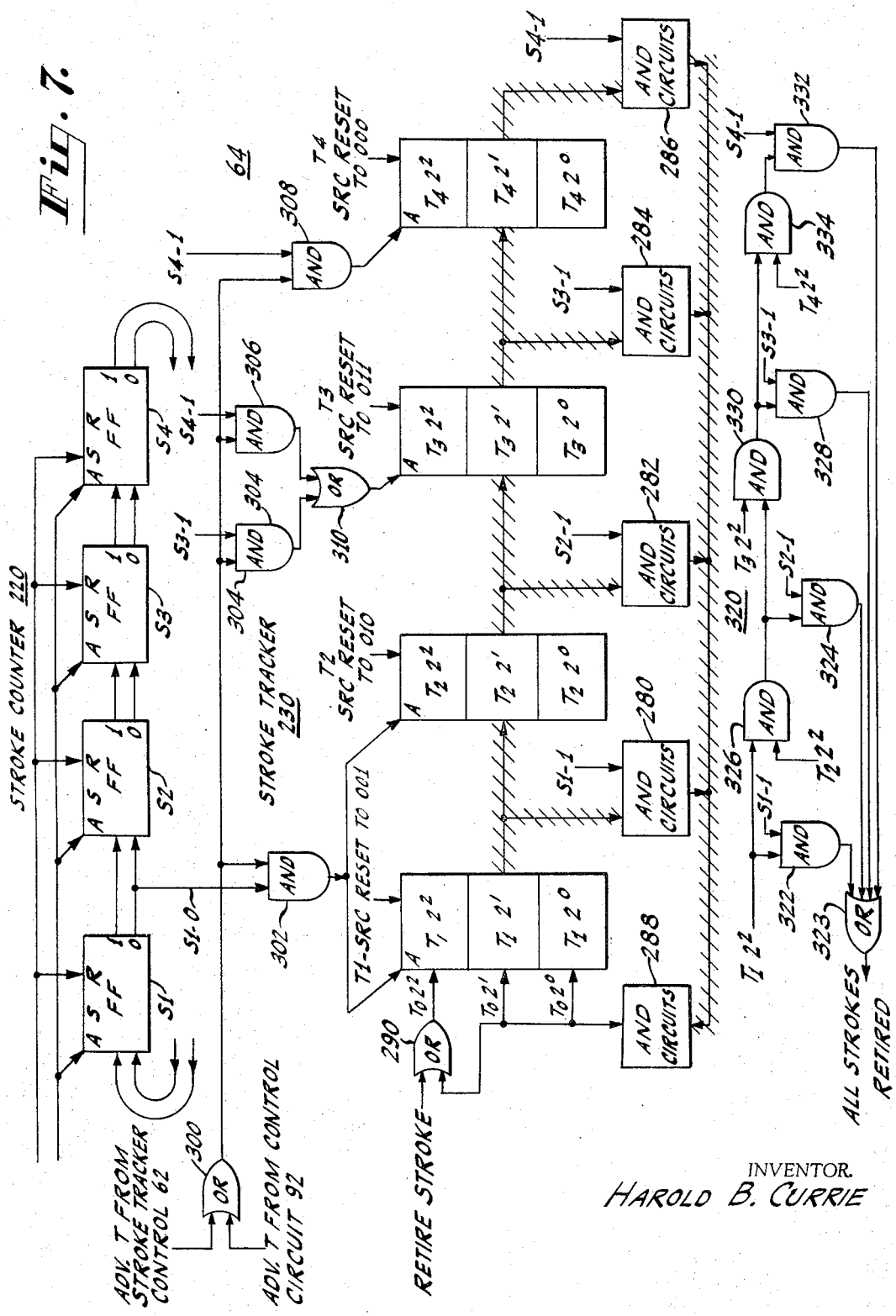

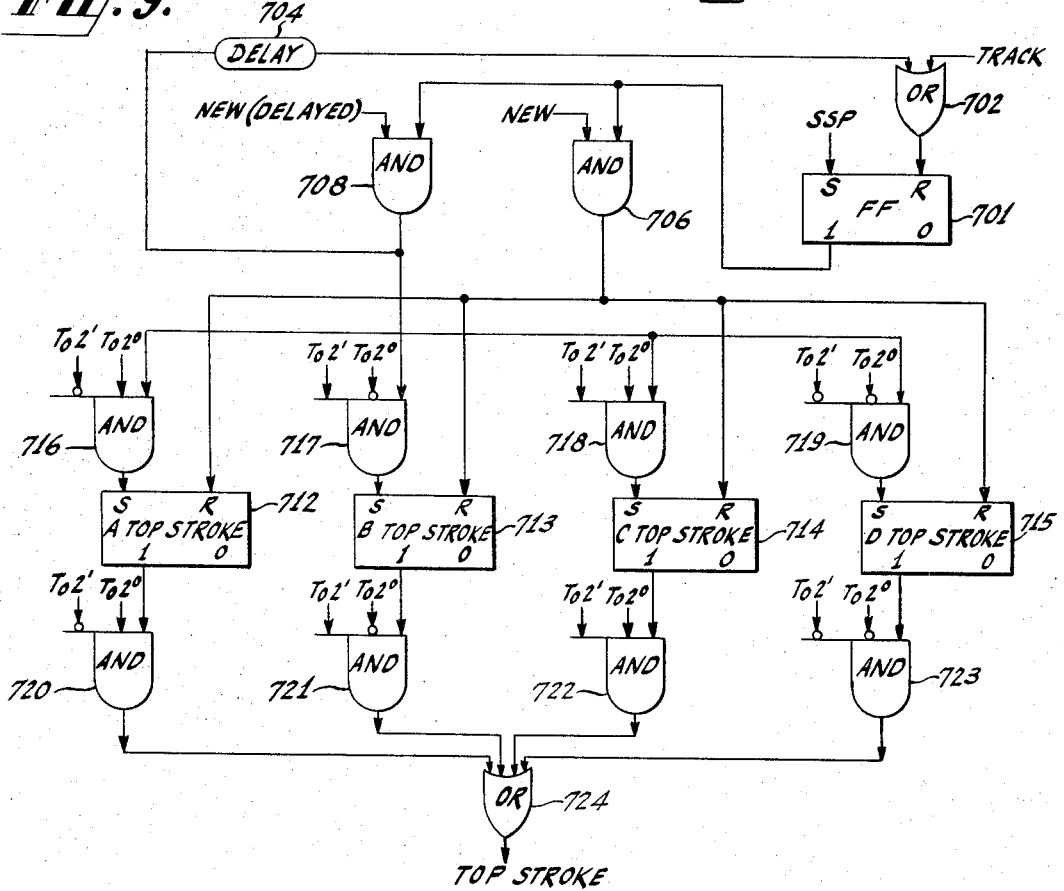
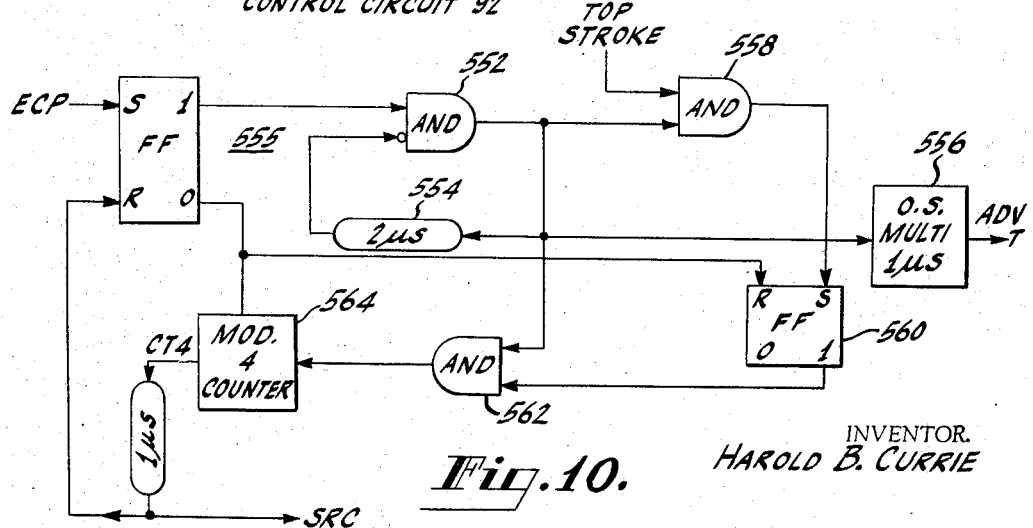

| SCAN LINE | SCANNING LOCATION | PULSE ANALYZER OUTPUT | STROKE COUNTER | STROKE TRACKER OLD | STROKE TRACKER NEW |
|---|---|---|---|---|---|
| (1) SC1 | $P_1T$ | NEW | 1000 | ABCD | ABCD |
| (2) SC2 | $P_2T$ | NEW | 0100 | ABCD | BACD |
| (3) SC2 | $P_3T$ | TRACK | 0100 | BACD | ABCD |
| (4) SC3 | $P_4T$ | TRACK | 0100 | ABCD | BACD |
| (5) SC3 | $P_5T$ | TRACK | 0100 | BACD | ABCD |
| (6) SC4 | $P_6T$ | TRACK | 0100 | ABCD | BACD |
| (7) SC4 | $P_7L$ | FORK | 0010 | BACD | CBAD |
| (8) SC4 | $P_8T$ | TRACK | 0010 | CBAD | ACBD |
| (9) SC5 | $P_9T$ | TRACK | 0010 | ACBD | BACD |
| (10) SC5 | $P_{10}T$ | TRACK | 0010 | BACD | CBAD |
| (11) SC5 | $P_{11}T$ | TRACK | 0010 | CBAD | ACBD |
| (12) SC6 | SAME AS SCAN SC5 | | | CBAD | ACBD |
| (13) SC7 | $P_{15}T$ | TRACK | 0010 | ACBD | BACD |
| (14) SC7 | $P_{13}T$ (DELAYED) | TRACK | 0010 | BACD | CBAD |
| (15) SC7 | $P_{14}L$ (DELAYED) | JOIN | 0010 | CBAD | A'CBD |
| (16) SC8 | $P_{15}L$ (DELAYED) | END | 0010 | A'CBD | B'A'CD |
| (17) SC8 | $P_{16}L$ (DELAYED) | END | 0010 | B'A'CD | C'B'A'D |

*Fig. 11.*

United States Patent Office 3,349,372
Patented Oct. 24, 1967

3,349,372
FIRST STROKE LOCATOR FOR A
CHARACTER READER
Harold B. Currie, Gibbsboro, N.J., assignor to Radio Corporation of America, a corporation of Delaware
Filed July 20, 1964, Ser. No. 383,679
7 Claims. (Cl. 340—146.3)

This invention relates to character readers, and more particularly to character recognition methods and circuits.

Certain character readers read documents by scanning each character by a plurality of successive vertical scanlines to derive serially occurring video pulses. Video signals occur whenever the outline trace of the character is intercepted in the scanlines and the succession of pulses serially represent the topographical features of the character. The topographical features of a character may include, among other things, the strokes or divisions into which the outline trace of a character is divisable. The number and the positioning of the strokes in the characters as well as how they began and end are relied upon, among other features, for differentiating one character from another. For example, a stroke may begin as a new stroke or as a fork away from a previously existing stroke and may end as a join to another stroke or end by itself.

Each of the strokes in a character is detected, tagged with a label, i.e., A, B, etc., and then tracked from scanline to scanline in order to store the features detected from the stroke in a storage medium for that stroke. Thus, at the end of scanning a character, a plurality of stroke feature signals are stored in separate storage mediums, one for each stroke detected in the character. Identification is based on obtaining a specified number and type of feature signals which unambiguously describe the character. Such a character description is derived by analyzing a character to ascertain the feature signals that occur when the character is scanned. Thus, the character description is based upon data relating to the absolute strokes in a character, i.e., the top or first stroke, the second stroke, etc. However, the detected and stored feature signals correspond to the tagged strokes, i.e., A, B, etc., not the absolute strokes, i.e., 1, 2, etc., which exist in the character. In characters from some fronts, the top or outermost stroke of a character may not be the first stroke detected when scanning the character. Therefore, to correctly associate the detected feature signals with the correct absolute strokes it is desirable to identify which of the tagged strokes is actually the outermost or first stroke in the character. Once the top stroke is located, the sequence of the detection of the other tagged strokes in the character corresponds exactly to the sequence of the absolute shrokes in the character.

Accordingly, it is an object of this invention to provide a new and improved character reader.

It is another object of this invention to provide a character reader wherein the outermost stroke of a character is accurately identified.

It is a further object of this invention to provide a character reader wherein the strokes in the character are correctly positioned.

In an embodiment of the invention, characters printed on a document are scanned successively by a plurality of vertical scans to derive video signals which serially represent the feature of a character. The video signals are analyzed to detect the strokes in a character. A stroke which is detected as a new stroke in a scanline is classified as the top or outermost stroke in the absence of the prior detection of another stroke in the same scanline.

In the drawing:

FIGURE 1 is a schematic block diagram of a character reader embodying the invention;

FIGURES 2 and 3 are diagrammatic representations of the scanning of an individual character by the character reader of FIGURE 1;

FIGURES 6 and 7 are block diagrams of a stroke tracker control circuit and a stroke tracker utilized in the character reader of FIGURE 1;

FIGURE 9 is a block diagram of a top stroke locator utilized in the character reader of FIGURE 1;

FIGURE 10 is a block diagram of a control circuit for the character determining circuit; and FIGURE 11 is a tabular representation of the tracking of strokes in the stroke tracker of FIGURE 7.

Figure 4:
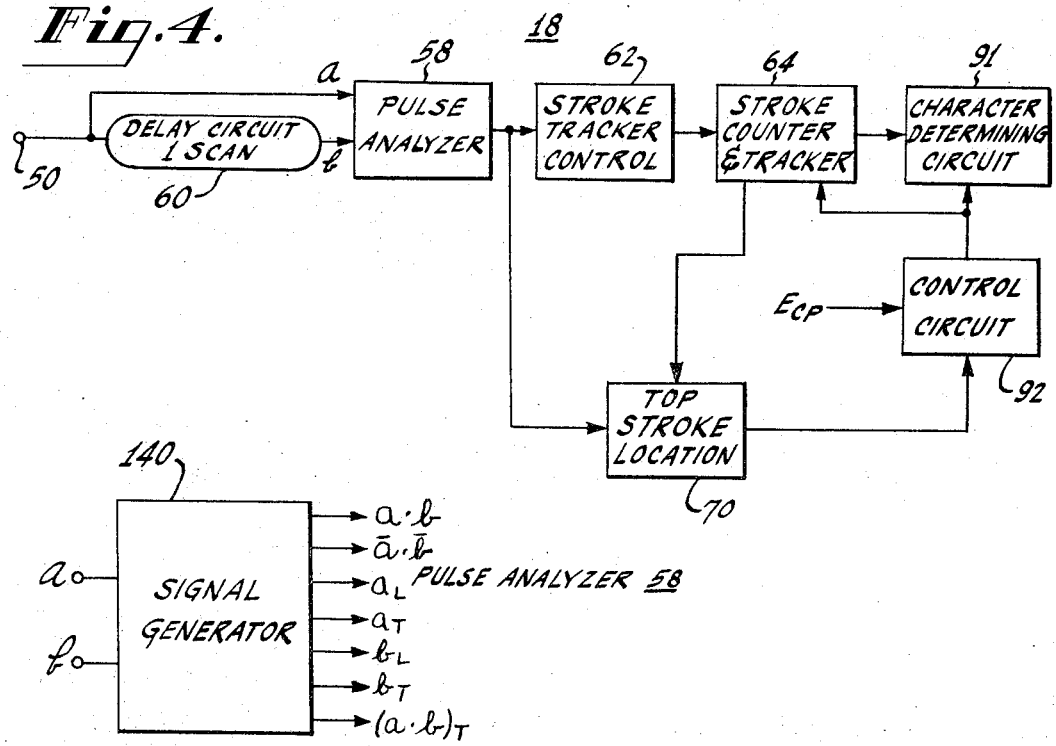
FIGURE 4 is a block diagram of the feature recognition circuits utilized in the character reader of FIGURE 1.

Referring now to FIGURE 1, a character reader 10 includes a transport mechanism or document handling device 11 for transporting a document 12 having characters 13 printed thereon. The mechanism 11 positions the document 12 so that the characters 13 are scanned by an electro-optical pickup device or scanner 14. The scanner 14 may comprise an electronic scanning system such as a vidicon camera tube system or alternatively may comprise a mechanical rotating disc scanning system of the Nipkow type. The characters 13 are normally printed on a horizontal line on the document 12 and the characters are scanned successively by a plurality of vertical scanlines which begin at the right of a character and end at the left thereof. The document 12 is moved relative to the scanner 14 at a substantially constant velocity so that successive vertical portions of the character 13 are traversed by successive scans. In FIGURE 1 the transport mechanism is arranged to move the document 12 past the scanner 14 in the direction of the arrow 15.

The output or video signals derived from the scanner 14 are applied to the video processing and quantizing circuit 16 which processes the video signals to provide uniform amplitude pulses having fast rise and fall times. The scanner 14 also generates a start scan pulse SSP at the start of every scan.

The quantized video signals from the quantizer 16 are applied to a feature recognition circuit 18 which extracts and stores the desired feature signals. At the end of scanning a character, the feature recognition circuit 18 recognizes the various detected feature signals as a particular character and produces a digitalized code representing the character. The coded output of the feature recognition circuit 18 is applied to an output circuit 20, for example a digital computer, for further processing.

Character scanning

FIGURE 2 shows the manner in which an individual character, a numeral 2, is scanned by the scanner 14. A character is scanned from top to bottom while the document is simultaneously moved from left to right by the transport mechanism 11. Thus, each character is scanned substantially orthogonally and successively by a plurality of substantially vertical scanlines commencing at the right and ending at the left of the character. In FIGURE 2, eight scanlines numbered from 1 to 8 are shown as scanning the character. Other scanning patterns may be utilized. Each of the scanlines commences at a line 24 toward the top of the document 12 and ends at a terminal line 26 toward the bottom of the document.

Video pulses are generated by the scanner 14 during the portions of the scanlines when the outline trace of a character is intercepted because of the contrast between the dark characters and a light document. The video pulses derived from reading the dark characters will be referred to herein as black pulses. The absence of video pulses will be referred to as white level or white pulses. The output signals from the scanner 14 are represented in FIGURES 2 and 3 as a series of lines containing pulses $P_1$, $P_2$, etc., representing the interception of the outline trace of the character. The pulses in FIGURE 3 are shown as quantized pulses after processing by the quantizer 16.

*Character features*

The topographical features of the characters extracted from the quantized video signals by the feature recognition circuits 18 include the strokes exhibited by the characters. A stroke may begin as a completely new stroke or as a fork from a previously existing stroke and may end by itself or end as a join to another stroke. The outline trace of the numeral 2 in FIGURE 2 includes three strokes. A first or top stroke 30, a second or middle diagonal stroke 32, and a third or bottom stroke 34. When scanning from right to left, the top and bottom strokes 30 and 34 begin as new strokes while the middle stroke 32 begins as a fork from the previously existing top stroke 30. The top 30 and middle 32 strokes end by themselves while the bottom stroke 34 ends as a join to the middle stroke 32.

The above stroke features are extracted from the quantized video signals by the feature recognition circuits 18 as will now be briefly described. It is assumed in this description that the eight scans labeled in FIGURE 2 are the only ones that occur in scanning the numeral 2. The scan SC1, as shown in FIGURE 3, intercepts only the bottom stroke 34 to produce only a single pulse $P_1$ in this scan. The pulse $P_1$ occurring for the first time indicates that a new stroke is detected and it is counted. Thus, a stroke is effectively defined by the character reader as a black video pulse or a black crossing occurring in the video signal. The feature recognition circuits 18 tags the new stroke with a label, e.g., stroke A, and tracks its occurrence throughout the remaining scans of the character.

The scan SC2 produces pulses $P_2$ and $P_3$. The pulse $P_2$ represents a video pulse which occurred for the first time in this portion of a scanline so the feature recognition circuit 18 detects this pulse as a new stroke (the stroke 30) and tags it as stroke B. A second stroke is counted for this character. The present pulse $P_3$ occurring in this scanline SC2 overlaps the delayed pulse $P_1$ (as described later) in scanline SC1 so that the feature recognition circuit 18 recognizes that stroke A has occurred again. A track signal is therefore produced to denote that stroke A is being tracked.

The scan SC3 produces pulses $P_4$ and $P_5$. The present pulses $P_4$ and $P_5$ overlap, respectively, the delayed pulses $P_2$ and $P_3$ so that the feature recognition circuit 18 recognizes that the strokes B and A, respectively, have occurred again. Track B and track A signals are therefore produced. The scan SC4 produces three pulses $P_6$, $P_7$ and $P_8$ denoting that the character has three strokes. The pulse $P_6$ causes a track signal for the stroke B (i.e., for the stroke 30) to be generated. However, the pulse $P_7$ is a newly detected stroke. Since the video signal becomes white between the pulses $P_6$ and $P_7$, whereas in the previous scan the corresponding portion of the video signal was a non-interrupted black level, the stroke begins as a fork away from a previously existing stroke. Therefore, a third stroke is counted and is tagged stroke C (i.e., stroke 32). The scans SC5 and SC6 produce track signals for the B, C and A strokes, respectively, when they occur.

In the scan SC7, two pulses $P_{15}$ and $P_{16}$ occur during the same portions of the scanline that three pulses $P_{12}$, $P_{13}$ and $P_{14}$ occurred in the previous scanline. The present pulse $P_{16}$ overlaps both the delayed pulses $P_{13}$ and $P_{14}$. This indicates to the feature recognition circuits 18 that a stroke ended as a join to another. The stroke A (the bottom stroke 34) ends by merging or joining the stroke C (the middle stroke 32). Track (B), track (C) and join (A) signals are therefore produced during scanline SC7. In the scan SC8 the scanner 14 is scanning the intermargin space between characters. No video pulses are detected so an end signal for the stroke B (stroke 30) and an end signal for the stroke C (stroke 32) are generated in this scan.

*Feature recognition circuits*

Referring now to FIGURE 4, there is illustrated a block diagram of the feature recognition circuits 18. For simplicity all of the interconnections between the various blocks are not shown in FIGURE 4. The feature recognition circuits 18 include an input video signal terminal 50 to which are applied the quantized video signals derived from the quantizer 16. The video signals from the terminal 50 are applied directly to one input of a black crossing or pulse analyzer 58 as well as through a delay circuit 60 to the other input of the analyzer 58. The delay circuit 60 introduces a time delay into this video signal of exactly one vertical scan interval so that video signals from the present or direct scan $a$ and the previous or delayed scan $b$ are applied coincidentally to the pulse analyzer 58. The pulse analyzer 58 compares the direct $a$ and delayed $b$ scan signals to generate signals denoting the beginning of a stroke as either a new or fork stroke and denoting the termination of a stroke as either a join to another stroke or as an end by itself. The analyzer 58 also recognizes the reoccurrence of strokes previously encountered by producing track signals. Signals representing the detection of new, fork, track, join, and end stroke information are applied to a stroke tracker control circuit 62. The stroke tracker control circuit 62 functions to provide the necessary signals for the operation of the stroke counter and tracker circuit 64. The stroke counter and tracker circuit 64 operates to count and "tag" with differently coded labels each of the new and fork strokes detected in the analyzer 58. Each separate tag is utilized to energize or gate open a different location of a character determining circuit 91 so that stroke information signals relating to the separate strokes are stored in separate locations. The stroke counter and tracker 64 associates the correct tag to its corresponding stroke each time the stroke is redetected by the analyzer 58. Thus, the stroke is tracked from scan to scan and the stroke feature signals detected in the scans are stored in the proper location in the character determining circuit 91. The pulse analyzer 58 is also coupled to a top stroke locator 70. The top stroke locator 70 continuously looks for and identifies the top stroke of a character during the scanning of the character. When the end of scanning a character is reached, an end character pulse ECP, generated in a circuit not shown, is applied to a control circuit 92. The control circuit 92 initiates the recognition process in the character determining circuit 91 which leads to the identification of the character.

The first step in the recognition process is to locate the outermost or first stroke of the scanned character. The first stroke detected in scanning any character is tagged stroke A by the stroke counter and tracker circuit 64 even though this stroke is not necessarily the absolute topmost or first stroke of the character. For example, the bottom or third stroke in the numeral 2 in some fonts extends more to the right that the first or second strokes in the character. In right to left scanning, it would be detected first and tagged stroke (A) even though it is not the topmost stroke in the character. The next stroke detected is tagged stroke (B) even though this stroke may not be the second stroke of the character, etc. It is desired to translate the tagged strokes A, B, etc., into absolute strokes, i.e., first, second, etc., so that the stroke information feature signals, i.e., join, fork, etc., detected for each tagged stroke are associated with the correct absolute strokes in the character. For example, consider the numerals 2 and 5. Each character has three strokes. Two of the strokes in each character begin as new strokes while one begins as a fork away from another. Similarly, two of the strokes in each character end by themselves while one joins another. In the numeral 2, the first stroke begins as a new stroke and ends by itself. The second stroke begins as a fork and ends by itself. The third stroke begins as a new stroke and ends as a join. In the numeral 5, the first stroke begins as a new stroke and ends by itself. The second stroke begins as a new stroke and ends as a join. The third stroke begins as a fork and ends by itself. The stroke information signals for each character are so similar that a misreading can occur unless the first stroke is located in each character so as to identify both the first and the other strokes in the character. Once the first stroke is located, the second and following strokes are also located since the sequence of the tagged strokes in the stroke counter and tracker circuit 64 duplicates the positioning of the strokes in the character.

Pulse analyzer

Figure 5:
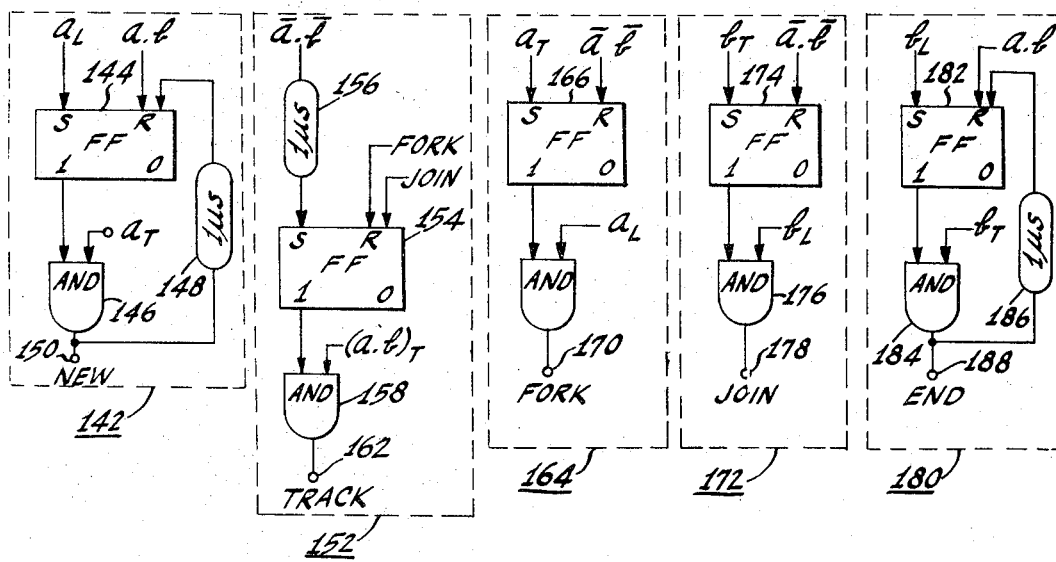
FIGURE 5 is a block diagram of a video pulse analyzer utilized in the character reader of FIGURE 1.

Referring now to FIGURE 5, a block diagram of the pulse analyzer 58 is shown. The logic circuits in the pulse analyzer 58 as well as in the other figures are made up of a plurality of flip-flops, shift registers, gates, etc., all of which may be of conventional or known design. The notation used in the drawings for the terminals of the flip-flops is S (set) for the set input terminals, R (reset) for the reset terminal, "1" for the set output terminal, and "0" for the reset output terminal. The time delays introduced by the various delay circuits are recorded on the drawing. Inhibit terminals in the various circuits are illustrated as small circles in the drawings and indicate that the circuits are disabled when a positive-going "1" input signal is applied to such a terminal.

The video signals from the direct $a$ and delayed $b$ scans are applied to a signal generator 140. The signal generator 140 generates from the signal $a$ and the signal $b$ by well-known circuitry the following signals:

$a \cdot b$—black video signals simultaneously present or overlapping in both the present and previous scans,
$\bar{a} \cdot \bar{b}$—white video signals simultaneously present or overlapping in both the present and previous scans,
$a_L$—pulse signal produced at leading edge of signal $a$,
$a_T$—pulse signal produced at trailing edge of signal $a$,
$b_L$—pulse signal produced at leading edge of signal $b$,
$b_T$—pulse signal produced at trailing edge of signal $b$,
$(a \cdot b)_T$—pulse signal produced at trailing edge of signal $a \cdot b$.

Note particularly that signal $(a \cdot b)_T$ occurs whenever both scans have been simultaneously black and either one or both of the scans go white. All of the above signals may, for example, be of one microsecond duration.

The pulse analyzer 58 includes a new stroke detector 142. The new stroke detector 142 includes a flip-flop 144 which is set by an $a_L$ signal and reset by an $a \cdot b$ signal. The "1" output terminal of the flip-flop 144 is coupled to one input of an AND gate 146, the other input of which comprises an $a_T$ signal. A new stroke pulse is derived from the output terminal 150 of the AND gate 146 and is also fed back through a delay circuit 148 to reset the flip-flop 144.

Thus, assuming the numeral 2 of FIGURE 2 is being read, the flip-flop 144 is set by the leading edge of a pulse in the present scan, such as the leading edge of the pulse $P_1$ in scan SC1 of FIGURE 3. Since no black video signal pulses occurred in the intermargin space before the scan SC1, no $a \cdot b$ signal is produced to reset the flip-flop 144. Therefore, when the trailing edge of the pulse $P_1$ occurs, the AND gate 146 is activated and a new stroke pulse is derived from the terminal 150. Thus, the stroke 34 in the numeral 2 is detected. The pulse output of the gate 146 is fed back through the one microsecond delay circuit 148 to reset the flip-flop 144 after the ending of the $a_L$ signal and thus prepares the new stroke detector 142 for the next pulse $P_2$ in the next scan. The pulse $P_2$ also produces a new stroke pulse in the scan SC2 and the stroke 30 in the numeral 2 (FIGURE 2) is detected.

The new stroke detector 142 therefore compares the present and previous scans of a character to produce an output if a black video pulse which exists in the present scan does not exist in the corresponding portion in the previous scan. This means that a new portion of the outline trace of a new stroke of a character is being scanned.

A track detector 152 is included in the pulse analyzer 58 to track strokes from scan to scan. The track detector 152 includes a flip-flop 154 which is set by coupling an $\bar{a} \cdot \bar{b}$ signal through a delay circuit 156 to the set terminal thereof. The flip-flop 154 is reset by an output signal from either a fork detector 164 or a join detector 172. The "1" output terminal of the flip-flop 154 is coupled to one input terminal of an AND gate 158, the other input of which comprises an $(a \cdot b)_T$ signal. A track pulse is derived from the output terminal 162 of the AND gate 158.

A track pulse is generated when black video pulses appear simultaneously in both the present and previous scans and no fork or join occurs. The white in the direct scan SC2 after the pulse $P_2$ and the initial white in the delayed scan SC1 in FIGURE 3 sets the flip-flop 154 and enables the AND gate 158. The overlapping occurrence of pulses $P_1$ and $P_3$ in these scans SC1 and SC2 produces an $a \cdot b$ signal and the trailing edge of these pulses produces an $(a \cdot b)_T$ signal. The AND gate 158 is therefore activated and a track pulse derived from the terminal 162 thereof. Thus, the track detector 152 has detected the stroke 34 of the numeral 2 a second time. A track pulse is also generated at the trailing edges of the pulse $P_2$ and the stroke 30 of the numeral 2 is detected a second time.

In scan SC4, track pulses are produced at the trailing edges of pulses $P_6$ and $P_8$ but not at the trailing edge of pulse $P_7$ since a fork occurs to reset the flip-flop 154.

A fork detector 164 is provided in the pulse analyzer 58 to detect the forking away of one stroke from another. The fork detector includes a flip-flop 166 which is set by an $a_T$ signal and reset by an $\bar{a} \cdot \bar{b}$ signal. The "1" output terminal of the flip-flop 166 is coupled to one input terminal of an AND gate 168, the other input of which is an $a_L$ signal.

The trailing edge of a pulse in a direct or present scan, such as the pulse $P_6$ in scan SC4 of FIGURE 3, sets the flip-flop 166 and enables the AND gate 168. The AND gate 168 is then activated by the leading edge of the pulse $P_7$ because no intervening white occurred simultaneously in the present and previous scans to provide an $(\bar{a} \cdot \bar{b})$ signal to reset the flip-flop 166. Thus, the fork detector 164 effectively detects the forking away of stroke 32 from stroke 30 in the numeral 2 of FIGURE 2.

A join detector 172 is included in the pulse analyzer 58 to detect the joining of two strokes. The join detector 172 includes a flip-flop 174 which is set by a $b_T$ signal and reset by an $\bar{a} \cdot \bar{b}$ signal. The "1" output of the flip-flop 174 is coupled to one input terminal of an AND gate 176, the other input of which comprises a $b_L$ signal.

During scan SC7 of FIGURE 3, the trailing edge of the delayed scan pulse $P_{13}$ (which first occurred in the scan SC6) sets the flip-flop 174 and enables the AND gate 176. No intervening white occurs simultaneously in both the present and previous scans to reset the flip-flop 174. Therefore, the leading edge of the next delayed scan pulse $P_{14}$ activates the gate 176 and produces a join pulse at the output terminal 178 thereof. Thus, the join detector 172 detects the merging of stroke 34 into stroke 32 in FIGURE 2.

An end detector 180 is included in the pulse analyzer 58 to detect when a stroke ends by itself rather than by joining another stroke. The end detector 180 includes a flip-flop 182 which is set by a $b_L$ signal and reset by an $a \cdot b$ signal. The "1" output terminal of the flip-flop 182 is coupled to one input of an AND gate 184, the other input of which comprises a $b_T$ signal. The output terminal 188 of the AND gate 184 is coupled through a delay circuit 186 to reset the flip-flop 182 when an end pulse is produced.

During the scan SC8 in FIGURE 3, the leading edge of the delayed pulse $P_{15}$ from the previous scan SC7 sets the flip-flop 182. No intervening black occurs simultaneously in both the scans SC7 and SC8 to reset the flip-flop 182, so the trailing edge of the pulse $P_{15}$ activates the AND gate 184 to produce an end pulse. The pulse output resets the flip-flop 182 in preparation for the generation of another end pulse for the pulse $P_{16}$. The end detector 180 therefore detects the ending of the strokes 30 and 32 in FIGURE 2 by detecting that no pulses representing these strokes appear in scan SC8.

Stroke tracker control

Figure 6:
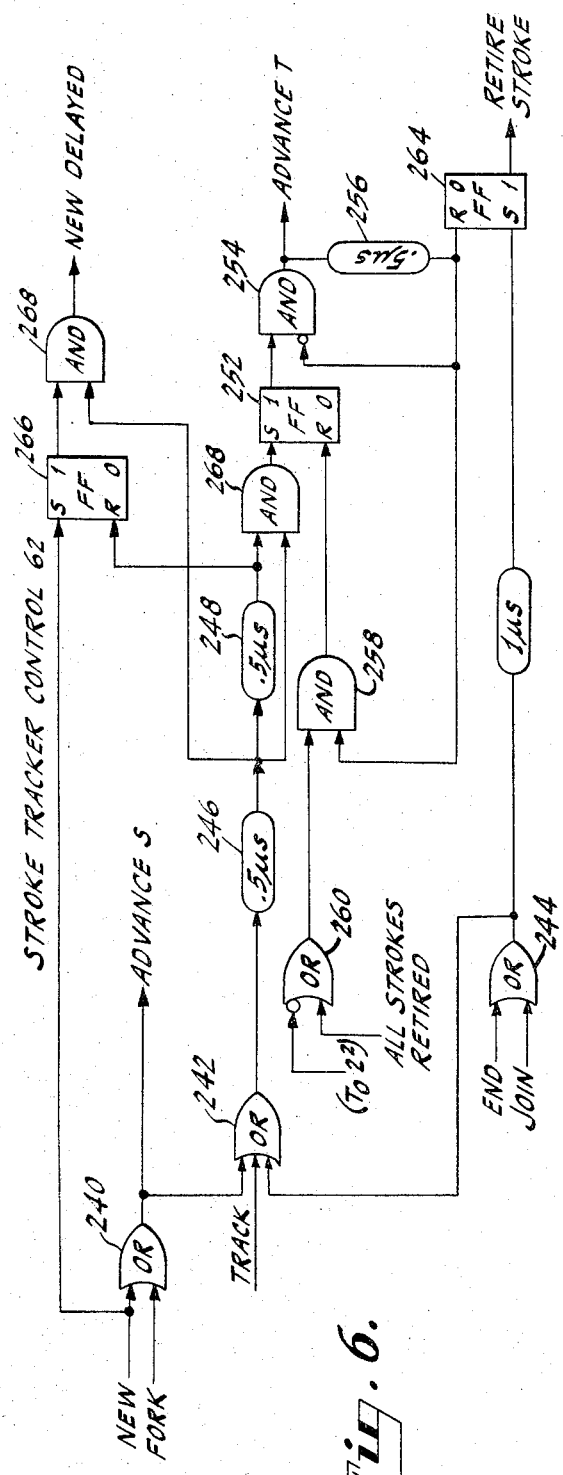

Referring now to FIGURE 6, a stroke tracker control circuit 62 is shown. The stroke tracker control circuit 62 generates the advance pulses for a stroke counter or S counter 220 (FIGURE 7) and a stroke tracker or T register 230 in the stroke counter and tracker circuit 64 (FIGURE 7). The stroke tracker control circuit 62 (FIGURE 6) includes an input OR gate 240, to which are applied the outputs of the fork and new stroke detectors 164 and 142, respectively, of FIGURE 5. The output of the OR gate 240 comprises advance S pulses for the stroke counter 220 (FIGURE 7).

The stroke tracker control circuit 62 also generates advance T pulses for the stroke tracker 230 and includes another input OR gate 242, the inputs of which comprise a track signal derived from the track detector 152 (FIGURE 5), an advance S pulse derived from the OR gate 240, and an output pulse derived from a third input OR gate 244. The inputs to the OR gate 244 comprise join and end signals derived from the join and end detectors 172 and 180 (FIGURE 5).

The OR gate 242 is coupled through first and second delay circuits 246 and 248 to one input of an AND gate 250. The other input to the AND gate 250 is derived from the junction of the delay circuits 246 and 248. Thus, the AND gate 250 is activated 1.5 microseconds after the OR gate 242 is activated. The output of the gate 250 sets a flip-flop 252 and the "1" output terminal of the flip-flop 252 is coupled to an AND gate 254. The output of the AND gate 254 is fed back through a delay circuit 256 to the other input terminal of the AND gate 254, which terminal is an inhibit terminal. The AND gate 254 supplies the advance T pulses for the stroke tracker 230 (FIGURE 7).

The flip-flop 252, the AND gate 254 and the delay circuit 256 comprise an oscillator 255 in that the AND gate 254 is activated by the setting of the flip-flop 252 and produces an output advance T pulse which is fed back after a .5 microsecond delay to cut off the gate 254. The duration of the advance T pulse is therefore 0.5 microsecond. As long as the flip-flop 252 remains set, the AND gate 254 will be activated again and again at a one microsecond period to generate a succession of advance T pulses.

The flip-flop 252 is reset by the output of an AND gate 258, one input of which is derived from the delay circuit 256. The other input to the gate 258 is derived from an OR gate 260. The OR gate is activated by an all strokes retired signal denoting that all the strokes of a character have either ended or joined. The OR gate 260 is also activated by a particular retired stroke signal ($T_0 2^2$) to be described subsequently. Both these signals are derived from the stroke tracker 230 (FIGURE 7). The signal ($T_0 2^2$) is applied to an inhibit terminal of the OR gate 260 causing the gate 260 to be activated in the absence of this signal; which is the normal operating condition thereof.

The stroke tracker control circuit 62 also produces a retire stroke signal indicating that a stroke has ended either as a join or an end. The OR gate 244 is coupled through a delay circuit 262 to the set terminal of a flip-flop 264 which produces a retire stroke signal level from the "1" terminal thereof when set. The flip-flop 264 is reset by an advance T pulse derived from the delay circuit 256.

The stroke tracker control circuit 62 also produces a new signal pulse which is delayed with respect to an advance S pulse. The new pulse input to the OR gate 240 is also coupled to the set terminal of a flip-flop 266, the reset terminal of which is coupled to the output of the second delay circuit 248. The "1" output terminal of the flip-flop 266, as well as the junction of the delay circuits 246 and 248, are coupled to the input terminals of an AND gate 268. The delayed new signal derived from the AND gate 268 is utilized in the top stroke locator 700 (FIGURE 9), as will be described subsequently.

Stroke counter and tracker

The stroke or S counter 220 (FIGURE 7) comprises a four-stage ring counter including four flip-flop stages labeled S1 through S4. The flip-flops S1 through S4 are connected in tandem with the output of the last stage S4 being connected back to the input of the first stage S1. The stroke counter 220 is initially reset to a 0001 condition by applying a start recognition cycle (SRC) pulse, to be described later, to the reset terminals of the stages S1 through S3 and to the set terminal of the stage S4. The "1" stored initially in the last stage S4 is advanced to the first stage S1 by the first advance S pulse applied to the advance terminals A when the first stroke has been detected in scanning a character. Successive detections of other strokes generate advance S pulses which are applied to the advance the "1" successively to the S2, S3, etc., stages of the counter. The ring counter 220 is coupled to control the cycling of the stroke tracker or T register 230. Ring counters of this type are known. Therefore, the details of the interconnections have not been illustrated.

The stroke tracker 230 comprises a four-stage, three-level ring register including a plurality of flip-flop circuits. The four stages of the T register 230 are labeled, from left to right $T_1$, $T_2$, $T_3$ and $T_4$, respectively, while the three levels are labeled $2^0$, $2^1$ and $2^2$, from bottom to top respectively. Thus, the flip-flop corresponding to the first stage in the first level is labeled $T_1 2^0$, the flip-flop corresponding to the third stage in the second level is $T_3 2^1$, etc.

The flip-flops in the $2^0$ level of the stroke tracker 230 are connected in tandem. The flip-flops in the $2^1$ and $2^2$ levels are each similarly connected. These multiple connections are represented in FIGURE 7 as a single lead line with diagonal strokes therethrough. An identical notation is utilized for other multiple connections both in FIGURE 7 and other figures of the drawings.

Each output of the four stages of the stroke tracker 230 is coupled back to the input of the first stage of its respective level. Thus, the outputs of each of the flip-flops in the four stages are coupled, respectively, to AND circuits 280, 282, 284 and 286, which circuits are, respectively, enabled by the "1" output level of the flip-flops S1 through S4 in the S counter 220. All of the AND circuits 280 through 286 are coupled to OR circuits 288. The first two levels of the stroke tracker 230, i.e., the $2^0$ and $2^1$ levels, are coupled via the OR circuits 288 directly to the input terminals of the flip-flops $T_1 2^0$ and $T_1 2^1$, respectively, while the third level is coupled through an OR gate 290 to the input terminals of the flip-flop $T_1 2^2$. The input leads to the first stage $T_1$ are labeled $T_0 2^0$, $T_0 2^1$, and $T_0 2^2$.

Figure 8:
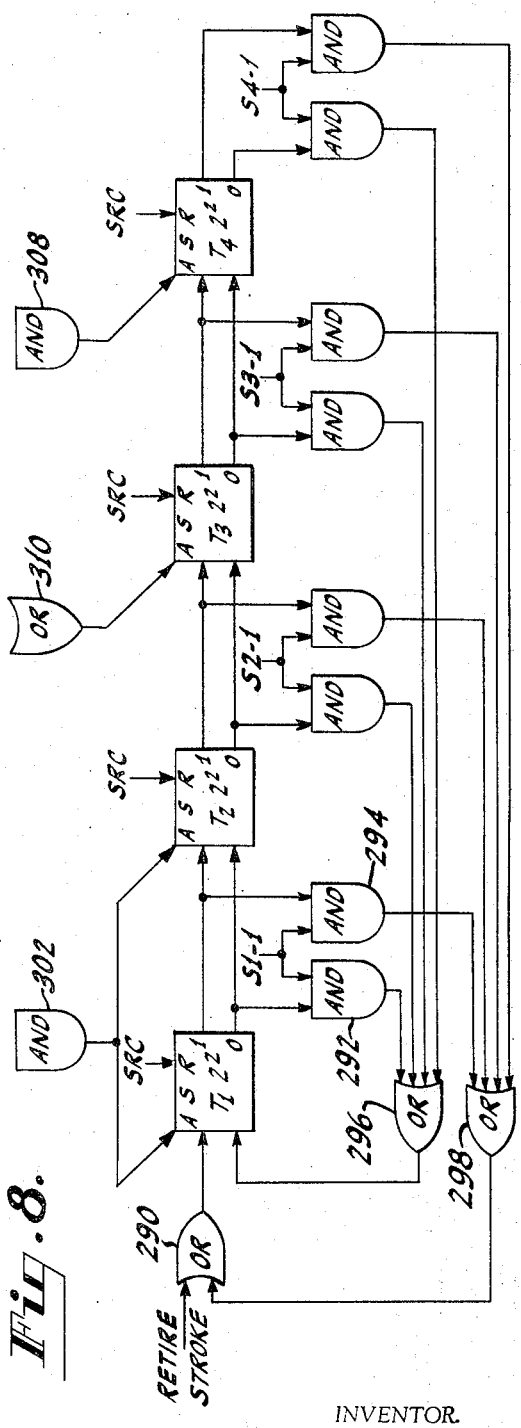
FIGURE 8 is a detailed schematic block diagram of one level of the stroke tracker of FIGURE 6.

A more detailed schematic of the various connections in the stroke tracker 230 for one level, the $2^2$ level, is shown in FIGURE 8. With the exception of the OR gate 290, the $2^0$ and $2^1$ levels of the stroke tracker 230 would be connected identically. Thus, it is apparent that the AND circuits 280 (FIGURE 7) includes the AND gates 292 and 294 (FIGURE 8) as well as similar pairs of AND gates in the $2^0$ and $2^1$ levels. The same is true of the AND circuits 282 through 286. The OR circuits 288 include OR gates 296 and 298 as well as similar pairs of OR gates in the $2^0$ and $2^1$ levels.

Referring back to FIGURE 7, each of the four stages $T_1$–$T_4$ of the stroke tracker 230 is coupled together to have a common advance terminal A. Advance T pulses are applied to the stroke tracker 230 from the stroke tracker control circuit 62 (FIGURE 6) and from the control circuit 92 (FIGURE 10), to be described later, through an OR gate 300. The output of the gate 300 is coupled to one input terminal of AND gates 302, 304, 306 and 308. The other input to the AND gate 302 is derived from the "0" output terminal, lead S1–0 of the S1 stage of the stroke counter 220. The output of the AND gate 302 is coupled to the common advance terminals of each of the $T_1$ and $T_2$ stages of the stroke tracker 230. Thus, the $T_1$ and $T_2$ stages do not have advance T pulses applied to them when a "1" is stored in the flip-flop S1. The other inputs to the AND gates 304 and 306 are derived from the "1" output terminals of the stroke counter stages S3 and S4, respectively. The outputs of the AND gates 304 and 306 are coupled through an OR gate 310 to the common advance terminal A of the $T_3$ stage of the stroke tracker 230. Finally, the other input to the AND gates 308 is derived from the "1" output terminal of the S4 stage of the counter 220 and the output of the gate 308 is coupled to the common advance terminal A of the $T_4$ stage of the tracker 230. Thus, the application of advance pulses to the stroke tracker 230 stages are controlled by the stroke counter 220.

The $T_1$ stage of the tracker 230 is initially reset by a start recognition cycle (SRC) signal to store 001, by applying the SRC signal to the reset terminals of the flip-flops $T_1 2^2$ and $T_1 2^1$, respectively, and to the set terminal of the flip-flop $T_1 2^0$. Similarly, the stages $T_2$, $T_3$ and $T_4$ are reset to store 010, 011 and 000, respectively. The data stored in the $2^1$ and $2^0$ levels of each of the stages $T_1$ through $T_4$ corresponds to the tags or labels given to strokes in a character being read. Thus, 01 is the tag for stroke (A), 10 for stroke (B), 11 for stroke (C) and 00 for stroke (D). The data stored in the $2^2$ level of each of the stages $T_1$–$T_4$ indicate whether or not a stroke has been retired either as a join or an end. Initially, all of the stages $T_1$–$T_4$ have a "0" stored in the $2^2$ level. As a stroke ends or joins, a "1" is stored in the $2^2$ level for that stroke. Thus, 101 indicates that stroke (A) has retired.

Included in the stroke tracker 230 is a circuit 320 for indicating when all the strokes in a character have been retired. The all strokes retired circuit 320 includes a plurality of AND gates coupled to the $2^2$ or retired stroke level of the stroke tracker and to the stroke counter 220. Thus, if one stroke has been counted by the S1 stage in the S counter 220, an AND gate 322 is activated when a "1" is stored in the flip-flop $T_2 2^2$. Since only one stroke has been counted by the S counter 220, an all strokes retired signal is produced by an OR gate 323. If two strokes have been counted, an AND gate 324 is enabled by the output of the S2 stage of the S counter and activated when an AND gate 326 is first activated by "1"'s stored in the retired strokes flip-flops $T_1 2^2$ and $T_2 2^2$ in the first two stages of the stroke tracker 230. A pair of AND gates 328 and 330 perform the same function when three strokes, which are counted in a character, are retired. Another pair of AND gates 332 and 334 do the same for four strokes. The all strokes retired signal is applied to OR circuit 260 of FIGURE 6 to prevent the oscillator 255 in the stroke tracker control circuit 62 from producing any further advance T pulses.

The stroke counter 220 and stroke tracker 230 of FIGURE 7 make provision only for a maximum of four strokes in a character. If some characters in a particular font contain more strokes, other stages can readily be added to the stroke counter and tracker.

*Top stroke locator*

Referring now to FIGURE 9, a top stroke locator 700 is shown. The top or outermost stroke locator includes an input flip-flop 701 which is set by a start scan pulse (SSP) generated in the scanner 14. The flip-flop 701 is reset by the output of an OR gate 702, the inputs to which comprise a track signal derived from the pulse analyzer 58 (FIGURE 5) and the output of a delay circuit 704. The "1" output terminal of the flip-flop 701 is coupled to one input terminal of each of the AND gates 706 and 708. The other input to the AND gate 706 comprises a new signal derived from the pulse analyzer 58 whereas the other input to the AND gate 708 comprises a new (delayed) signal also derived from the pulse analyzer 58. The output of the AND gate 708 is fed through the delay circuit 704 to comprise the other input to the OR gate 702.

A plurality of flip-flops 712–715 are provided to designate which of the strokes A through D is the top stroke. A plurality of AND gates 716–719 are coupled to the set terminals S, respectively, of the flip-flops 712–715, while the reset signal for each of these flip-flops comprises the output of the AND gate 706. One input to each of the AND gates 716–719 comprises the output of the AND gate 708, whereas the other inputs to each of the gates 716–719 are derived from the $T_0$ leadlines of the stroke tracker 230. Each gate admits a different stroke code beginning with the stroke A code for the gate 716 and ending with the stroke D code for the gate 719. The "1" output terminals of each of the flip-flops are coupled to one input terminal of the AND gates 720–723, respectively. The other inputs to the AND gates 720–723 comprise the stroke codes A through D from the $T_0$ leadlines of the stroke tracker 230 similar to the gates 716–719, respectively. All of the outputs of the AND gates 720 through 723 are coupled to an OR gate 724, the output of which is a top or first stroke signal.

*Control Circuit*

Referring now to FIGURE 10, a control circuit 92 for the character determining circuits 91 is shown. The control circuit 92 operates to provide the advance T pulses to cycle the stroke tracker 230 until the topmost or first stroke appears in a prescribed location so that the other strokes detected may be correctly referenced thereto.

The control circuit 92 includes an input flip-flop 550 which is set by an end character pulse (ECP) generated when the end of scanning a character occurs. The "1" output terminal of the flip-flop 550 is coupled to one input terminal of an AND gate 552. The output of the AND gate 552 is coupled through a delay circuit 554 to the other input of the AND gate 552, which is an inhibit input terminal. Thus, the flip-flop 550, the AND gate 552 and the delay circuit 554 function as an oscillator 555 wherein the setting of the flip-flop 550 causes output pulses to be produced with a 4 microsecond period. The output of the AND gate 552 is coupled to a one-shot multivibrator 556. The one-shot multivibrator 556 is triggered to produce an advance T pulse on the trailing edge of the output pulse of the oscillator 555.

The output of the AND gate 552 is also coupled to one input of an AND gate 558. The other input to the gate 558 comprises a top or first stroke signal derived from the OR gate 724 in the top stroke locator 700 (FIGURE 9). The activation of the AND gate 558 sets a flip-flop 560. The "1" output terminal of the flip-flop 560 as well as the output pulses of the oscillator 555 are coupled to an AND gate 562. The AND gate 562 is coupled to a modulo (mod.) 4 counter 564. A count of "4" (CT4) in the counter 564 produces an output which is applied to a second delay circuit 566. The output of the delay circuit 566 is fed back to reset the input flip-flop 550.

Thus, the pulse output of the oscillator 555 produces advance T pulses from the multivibrator 556 for cycling the stroke tracker 230. When the outermost stroke is located, the advance T pulses are counted in the counter 564 and at a count of "4" (the maximum number of strokes in a character) the input flip-flop 550 is reset and a start recognition cycle (SRC) signal is generated.

*Operation*

In describing the operation of the character reader 10, it will be assumed that the numeral 2 in FIGURE 2 is being scanned by the scanner 14. As an aid in describing the operation, the table of FIGURE 11 is utilized to trace the sequence of strokes in the stroke tracker 230. In the table of FIGURE 11, the notation $P_1L$ means the leading edge of $P_1$ in scan SC1 of FIGURE 3 and $P_1T$ means the trailing edge of this pulse. A similar notation is utilized for the other pulses. The notation ABCD means that the tags or codes 001, 010, 011 and 000 are initially stored in the stages $T_1$ through $T_4$, respectively, of the stroke tracker 230. As the strokes are tracked, the letters become scrambled, i.e., CBAD, etc. The first letter "C" indicates that the code 011 is now stored in the first stage $T_1$ of the stroke tracker 230, etc. When one of the letters is primed, it means that this tag has a "1" stored in the $2^2$ level, i.e., $A'=101$. This indicates that the stroke has been retired as either a join or an end.

In the scan SC1, the leading edge of pulse $P_1(a_L)$ sets the flip-flop 144 in the new stroke detector 142 in the black crossing analyzer 58 (FIGURE 5). The trailing edge of pulse $P_1$ ($a_T$) activates the AND gate 146 and produces a new stroke pulse from the new stroke detector 142. The flip-flop 144 is reset by this pulse. The new stroke pulse is applied to the OR gate 240 in the stroke tracker control circuit 62 (FIGURE 6) and produces an advance S pulse. The advance S pulse is applied to the ring counter 220 (FIGURE 7) and advances the "1" stored in the S4 stage in the S1 stage. One stroke has therefore been counted.

The AND circuit 280 in the stroke tracker 230 (FIGURE 7) is activated and the $T_0$ inputs contain the stroke A code. Thus, stroke 34 in FIGURE 2 has been detected and labeled stroke A.

The new stroke pulse also sets the flip-flop 266 (FIGURE 6) so that when the advance S pulse is coupled through the OR gate 242 and delay circuit 246, the AND gate 268 is activated to produce a delayed new pulse. Both the new and the delayed new pulses are applied to the outermost stroke locator 700 (FIGURE 9). The new pulse activates the AND gate 706 because this gate is previously enabled by the "1" output signal from the flip-flop 701 due to the setting of this flip-flop by a start scan pulse at the start of the scan SC1. The output of the AND gate 706 resets the flip-flops 712 through 715.

The delayed new pulse activates the AND gate 708 in the first stroke locator 700 because this gate is also previously enabled by the flip-flop 701. The output of the AND gate 708 is applied to each of the AND gates 716 through 719. The AND gate 716 is activated because the stroke A code is contained in the $T_0$ leadlines and this code previously enables the gate 716. The flip-flop 712 is set by the output of the gate 716 denoting for the present that stroke A (the stroke 34 in FIGURE 2) is the top stroke in the character being read. The output of the AND gate 708 is also fed back through the delay circuit 704 to reset the flip-flop 701 to prevent a second new signal in the same scanline from relocating the top stroke.

The advance S pulse also sets the flip-flop 252 in the stroke tracker control circuit 62 (FIGURE 6) after a delay introduced by the delay circuits 264 and 248. The AND gate 254 is therefore activated and an advance T pulse produced. The advance T pulse is fed back to inhibit the AND gate 254 as well as to activate the AND gate 258. The AND gate 258 had been previously enabled by the inversion of the existing "0" in the $T_0 2^2$ leadline. The flip-flop 252 is therefore reset preventing additional advance T pulses from being generated by the oscillator 255. The advance T pulse is applied to the OR gate 300 (FIGURE 7) but does not advance the stroke tracker 230 since none of the AND gates 302, 304, 306 and 308 are enabled by the stroke counter 220. Thus, at the end of the scan SC1, the stroke 34 of FIGURE 2 is the first stroke detected in the character and is tagged stroke A. This stroke is also denoted the top stroke because no other stroke is detected in the scan prior to the detection of the stroke 34.

In the scan SC2, the pulse $P_2$ causes a new stroke pulse to be generated by the new stroke detector 142 (FIGURE 5) and an advance S pulse to be produced by the stroke tracker control circuit 62 (FIGURE 6). This advance S pulse advances the "1" in the stroke counter 220 (FIGURE 7) to the S2 stage thereof. The AND circuit 282 and the OR circuit 288 in FIGURE 7 are activated while the AND circuit 280 is deactivated. The B stroke code therefore appears in the $T_0$ leadlines of the stroke tracker 230 because of the activation of the AND circuits 282.

The new pulse also activates the AND gate 706 in the top stroke locator 700 to reset the flip-flops 712 through 715. Thus, stroke A is no longer recorded as the top stroke of the character. A delayed new pulse produced in the stroke tracker control circuit 62 by the advance S pulse is applied to activate the AND gate 717 in the top stroke locator 700. The gate 717 is previously enabled because the B stroke code appears in the $T_0$ leadlines. The activation of the gate 717 sets the flip-flop 713 and records that the B stroke (i.e., the stroke 30) is the top stroke in the character being scanned. The delayed new pulse is also fed back through the delay circuit 704 to reset the flip-flop 701.

The advance S pulse also causes one advance T pulse to be generated by the oscillator 255 (FIGURE 6) and the advance T pulse activates the AND gate 302 (FIGURE 7) to advance the $T_1$ and $T_2$ stages of the stroke tracker 230. The B stroke code 010 in the $T_2$ stage is fed back through the AND circuit 282 and OR circuit 288 to the $T_1$ stage while the A stroke code 001 is advanced to the $T_2$ stage. The $T_3$ and $T_4$ stages do not change because no advance pulses are applied to them due to the disabling of the AND gates 304, 306 and 308 by the S3 and S4 stages of the stroke counter 220. Thus, the stroke 30 in the character 2 of FIGURE 2 has been detected and tagged stroke B. This stroke is also recorded as the top stroke in the character. Two strokes have been counted in the character. The new state of the stroke tracker 230 is BACD with the A stroke code in the last stage ($T_2$) of the active cycling stages of the stroke tracker 230. Thus, the $T_0$ inputs contain the stroke A code and the stroke tracker 230 is awaiting the redetection of this stroke.

The absence of black video ($\bar{a} \cdot \bar{b}$) in the portion of the delayed ($b$) and present ($a$) video signals just prior to the pulse $P_3$ in scan SC2 (FIGURE 3) sets the flip-flop 154 in the track detector 152 (FIGURE 5). The trailing edge of pulse $P_3$, i.e., $(a \cdot b)_T$ activates the AND gate 158 and produces a track pulse. The track pulse is applied to reset the flip-flop 701 in the top stroke locator 700 (FIGURE 9). This track pulse has no effect in this example since this flip-flop is previously reset by the delayed new pulse produced by the pulse $P_2$ in the same scan SC2. A track pulse resetting of the flip-flop 701 normally prevents a new middle stroke from replacing a higher stroke as the outermost stroke of a character when the higher stroke is being tracked in the scan.

The track pulse is also applied to the OR gate 242 (FIGURE 6) and produces one advance T pulse. It is to be noted that no advance S pulse is produced since an existing stroke (i.e., stroke 34) has just repeated itself in a succeeding scan. The advnce T pulse advances the stroke tracker 230 (FIGURE 7) and the new sequence of strokes is ABCD as shown in line 3 of FIGURE 11.

In scan SC3, the trailing edge of the delayed pulse $P_2$ $(a \cdot b)_T$ generates a track pulse for stroke B (stroke 30) and the trailing edge of the present pulse $P_5$ $(a \cdot b)_T$ generates one for stroke A (stroke 34). The sequence of strokes in the stroke tracker 230 is therefore ABCD. Thus, the stroke tracker 230 is alternately cycling the stages $T_1$ and $T_2$ (i.e., the A and B stroke codes). The first track pulse in this scan SC3 also resets the flip-flop 701 in the outermost stroke locator 700. No new stroke pulses are produced in this scan so that the B stroke is still recorded as the top stroke.

In the scan SC4, the pulse $P_6$ generates a track pulse for stroke B (stroke 30). The scan SC4 goes white between pulse $P_6$ and the pulse $P_7$, while the previous scan SC3 remained black during this interval. Therefore, the flip-flop 166 in the fork detector 164 (FIGURE 5) is not reset after being set by the trailing edge of pulse $P_6$ ($a_T$). Therefore, the leading edge of pulse $P_7$ ($a_L$) activates the AND gate 168 and produces a fork signal. The fork signal is applied to reset the flip-flop 154 in the track detector 152 to prevent a track signal from being generated at the trailing edge of the delayed pulse $P_4$.

The fork signal is applied to the OR gate 240 in the stroke tracker control circuit 62 (FIGURE 6) and produces an advance S pulse. The stroke counter 220 is advanced to a count of "3." Therefore, stroke 32 in FIGURE 2 has been counted. The AND circuit 282 is deactivated and the AND circuit 284 is activated (FIGURE 7). Thus, the number of active stages in the stroke tracker 230 is increased and the $T_3$ stage is now the last active stage of the stroke tracker 230. The input leadlines $T_0$ contain the stroke C code 011. The fork signal has no affect on the top stroke locator 700 (FIGURE 9). The fork pulse however produces an advance T pulse in the stroke tracker control circuit 62 (FIGURE 6). The advance T pulse activates both the AND gates 302 and 304 in the stroke tracker 230 (FIGURE 7). The C stroke code is shifted from the $T_3$ stage to the $T_1$ stage. The $T_1$ and $T_2$ stages are also shifted so that the new sequence of strokes is CBAD (line 7, FIGURE 11). Thus, the third stroke (stroke C) has been correctly sequenced into the stroke tracker 230 and a fork is recorded for this stroke by the character determining circuits indicating that the stroke C began as a fork. The code in the $T_0$ leadlines of the stroke tracker 230 gates open various portions of the character determining circuit 91 to store in different locations the stroke data derived for strokes A through D. The pulse $P_8$ in this scan SC4 produces a track signal for the stroke A and shifts the stroke tracker 230 so that the sequence of strokes at the end of the scan SC4 is ACBD (line 8, FIGURE 11). The stroke counter 220 not only counts strokes but also increases the number of active stages in the stroke tracker 230 and correctly sequences into the tracker 230 each additional stroke when it is detected. The stroke tracker 230 thus tracks each stroke without confusion.

The scan SC5 produces track signals for the three strokes, i.e., strokes B, C and A in that order. The succeeding scan SC6 also does the same. The stroke B (stroke 30) is still recorded as the top stroke.

At the beginning of scan SC7, the sequence of strokes in the stroke tracker 230 is ACBD (line 13, FIGURE 11). Thus, the stroke tracker 230 is effectively waiting for stroke B, i.e., the stroke 30 to be tracked first. During the scan SC7, the trailing edge of the delayed pulse $P_{12}$ $(a \cdot b)_T$ from the previous scan SC6 produces a track signal for the top stroke B (stroke 30) and the stroke tracker 230 is shifted to the sequence BACD. The trailing edge of the delayed pulse $P_{13}$ (from the previous scan SC6) also produces a track pulse for the stroke C, i.e., stroke 32. The trailing edge of the delayed pulse $P_{13}$ ($b_T$) also sets the flip-flop 174 in the join detector 172 and the AND gate 176 is activated by the leading edge ($b_L$) of the succeeding delayed pulse $P_{14}$ (FIGURE 5). A join signal is therefore produced and recorded in the character determining circuits indicating that the stroke A ends as a join. No track signal is produced because the join pulse rests the flip-flop 154 in the track detector 152 and prevents a track pulse from being generated.

The join pulse is applied to the OR gate 244 in the stroke tracker control circuit 62 (FIGURE 6). The join pulse after being delayed by the delay circuit 262 sets the flip-flop 264 producing a retire stroke signal. The retire stroke signal is applied to the OR gate 290 in the stroke tracker 230 (FIGURE 7) and causes the $T_0 2^2$ input to go from low to high, i.e., "0" to "1."

The output of the OR gate 244 (FIGURE 6) is also applied to produce an advance T pulse (after the retire stroke signal) which causes the $T_1$ stage of the stroke tracker to store the code 101 or A'. Thus, stroke A is stored in the stroke tracker 230 as a retired stroke. The new sequence of strokes in the tracker 230 (line 15, FIGURE 11) is now A'CBD.

The scan SC8 does not intercept any portion of the outline trace of the numeral 2. During this scan, the leading edge of the delayed pulse $P_{15}$ ($b_L$) from the previous scan SC7 sets the flip-flop 182 in the end detector 180 (FIGURE 5). The trailing edge of this delayed pulse $P_{15}$ ($b_T$) activates the AND gate 184 and produces an end signal.

The end pulse is applied to the OR gate 244 to generate a retire stroke signal level. The retire stroke signal is applied to the OR gate 290 in the stroke tracker 230. The B stroke code 010 is in the $T_3$ stage of the stroke tracker 230. Thus, the advance T pulse also generated by the end pulse advances a retired B' stroke code or 110 into the $T_1$ stage of the stroke tracker 230 and the new sequence of strokes becomes B'A'CD.

The delayed pulse $P_{16}$ also produces an end signal. The end signal (for stroke C) generates an advance T pulse and changes the C code 011 to the C' code 111 while advancing the C' stroke code into the $T_1$ stage of the stroke tracker 230. The sequence of strokes in the tracker 230 is C'B'A'D and all of the detected strokes have been retired as either joins or ends.

The "1's" stored in the $2^2$ levels of the stroke tracker 230 stages $T_1$ through $T_3$ activate the AND gates 326, 330 and 328 in the all strokes retired circuit 320 (FIGURE 7), and generates an all strokes retired signal which is applied to the stroke tracker control circuit 62 (FIGURE 6) to prevent the generation of more advance T pulses.

The absence of black video in SC8 also causes an end character pulse (ECP) to be generated. The character reader now converts the letter codes of the strokes to numerical designations, i.e., topmost stroke 1, middle stroke 2, bottom stroke 3 when the topmost stroke is positioned in a particular location. The method for doing this is to shift the stroke tracker until the code for the topmost stroke appears in the $T_3$ stage. In this case, the B stroke has been detected and stored as the topmost stroke in the topmost stroke locator 700. The sequence of strokes existing in the stroke tracker at the time of the generation of an end character pulse ECP is C'B'A'D so that only one advance T pulse is needed to locate the top stroke B in the $T_3$ stage of the stroke tracker 230.

The ECP pulse is applied to start the oscillator 555 (FIGURE 10) to produce advance T pulses for the stroke tracker. The first advance T pulse shifts the codes in the stroke tracker to the sequence A'C'B'D. At this time, the B code is applied to activate the AND gate 721 (FIGURE 9). The other input to the gate 721 is the "1" output of flip-flop 713 (B top stroke). The AND gate 721 produces a topmost or outermost stroke signal which activates the AND gate 558 (FIGURE 10). The gate 558 in turn sets flip-flop 560 (FIGURE 10). The "1" output of flip-flop 560 activates the AND gate 562, which supplies pulses to the mod. 4 counter. The mod. 4 counter permits four advance T pulses to be sent to the stroke tracker 230 before a count of "4" (CT4) resets the flip-flop 550 and stops the oscillator 555 from generating additional advance T pulses.

The sequences which appear in the stroke tracker 230 for the four advance T pulses are:

A'C'B'D    B'A'C'D    C'B'A'D    A'C'B'D

As this sequence is shifted in the stroke tracker, stroke B is labeled as number 1 or the topmost stroke. As soon as the topmost stroke is located, then it is known that the next three codes to appear will be that of strokes 2, 3 and 4, respectively, strokes C and A are therefore labeled strokes 2 and 3, respectively. Stroke B is labeled as stroke 4 but since only three strokes were detected in the numeral 2, none of the stroke B information is used for stroke 4.

The character determining circuits 91 store the fact that the stroke C started with a fork and that the stroke A ended with a join, etc. When the C and A stroke codes appear in stroke tracker 230, the character determining circuit 91 converts the stroke C fork into a stroke 2 fork and the stroke A join into a stroke 3 join. Thus, all of the stroke information signals are converted into information signals for the absolute strokes in a character. The count of "4" (CT4) from the mod. 4 counter also produces a start recognition cycle (SRC) pulse which strobes the character determining circuit 91 and, finding that the character scanned had the features that stroke 2 began as a fork and that stroke 3 ended as a join, etc., it recognizes that the character scanned was the numeral 2. The SRC pulse also resets the stroke counter 220 and tracker 230 to await a new character.

What is claimed is:

1. In a character reader for reading characters from a document, different ones of said characters being formed of different outlines traces on said document, the outline traces of said characters exhibiting a plurality of topographical features including stroke features, said character reader including means for scanning successive ones of said characters by a plurality of scans to derive video signals serially representing the features of said character, the combination comprising, means for analyzing said video signals to generate a new stroke signal when a new stroke is detected in a scanline and a track stroke signal when a previously existing stroke is re-detected in a scanline, a stroke tracking multilevel shift register having a plurality of stages, one for each stroke in a character, with each stage preset to store a differently coded combination of stroke identification signals to identify each stroke in said character, a plurality of gate circuits, one for each stage of said register, connected between the output of each stage to the input of the first stage of said register to feed back to the input leadlines of said first stage the stroke identification signal which is gated through an activated one of said plurality of gate circuits, a counter for counting each additional one of said new stroke signals, means for coupling said counter to said plurality of gates to activate the gate in the stage of said shift register corresponding to the count in said counter, a plurality of gates with each separate one of said gates being enabled by a different stroke identification signal appearing in the input leadlines of said stroke tracking shift register, means for delaying said new stroke signals, and means for applying a delayed new stroke signal in a scanline to each of said gates in the absence of the prior detection of another stroke in said character.

2. In a character reader for reading characters from a document, different ones of said characters being formed of different outlines traces on said document, the outline traces of said characters exhibiting a plurality of topographical features including stroke features, said character reader including means for scanning successive ones of said characters by a plurality of scans to derive video signals serially representing the features of said character, the combination comprising, means for analyzing said video signals to generate a new stroke signal when a new stroke is detected in a scanline and a track stroke signal when a previously existing stroke is re-detected in a scanline, a stroke tracking multilevel shift register having a plurality of stages, one for each stroke in a character, with each stage preset to store a differently coded combination of stroke identification signals to identify each stroke in said character, a plurality of gate circuits, one for each stage of said register, connected between the output of each stage to the input of the first stage of said register to feed back to the input leadlines of said first stage the stroke identification signal which is gated through an activated one of said plurality of gate circuits, a counter for counting each additional one of said new stroke signals, means for coupling said counter to said plurality of gates to activate the gate in the stage of said shift register corresponding to the count in said counter, a plurality of storage devices one for each stroke of said character for indicating the top stroke of a character, a plurality of coincidence gates, one for each of said storage devices with each gate having an output coupled to its corresponding storage device, each separate one of said coincidence gates coupled to be enabled by a different stroke identification signal appearing in the input leadlines of said stroke tracking shift register, means for delaying each new stroke signal, and means for coupling a delayed new stroke signal in a scanline to each of said coincidence gates in the absence of the prior generation in said scanline of one of said track signals or another of said new stroke signals, said delayed new stroke signal activating the one coincidence gate enabled by a stroke identification from said stroke tracking shift register so that the corresponding storage device is set to classify which of the strokes in said character is the top stroke.

3. In a character reader for reading characters from a document, different ones of said characters being formed of different outline traces on said document, the outline traces of said characters exhibiting a plurality of topographical features including strokes, the combination comprising, means for scanning successive ones of said characters by a plurality of vertical scans to derive video signals representing the features of said character, means for generating a reference signal at the start of each scanline, means for analyzing said video signals to detect strokes in a character, means for generating a new stroke signal when a new stroke is detected in a scanline and a track stroke signal when a previously existing stroke is redetected in a scanline, a plurality of storage devices, one for each stroke in a character, with each having set and reset states, means for resetting each of said storage devices when a new stroke signal is generated in a scanline, a delay circuit for delaying said new stroke signal to provide a delayed new stroke signal, means for turning off said reference signal subsequent layed new stroke signal for a newly detected stroke in a character into its corresponding storage device to set said device so as to classify said newly detected stroke as the topmost stroke in said character, and means for utilizing said reference signal to gate a deto the generation of either one of said track and said delayed new stroke signals in a scanline to prevent the resetting of said device during said scanline.

4. In a character reader for reading characters, different ones of said characters being formed of different outline traces, the outline traces of said characters exhibiting a plurality of topographical features including strokes, said character reader including a scanner for scanning said characters to derive video signals representing said characters, the combination comprising, detector means for analyzing said video signals to detect strokes in a character, stroke tracking means coupled to said detector means for assigning labels in sequence to each different stroke detected in a scan and for tracking said strokes from scan to scan, classification means coupled to said stroke tracking means for classifying as the outermost stroke of a character the particular stroke initially detected in a particular scan of said character regardless of the label of said particular stroke and in the absence of the prior detection of another stroke in said particular scan, reclassification means for transferring the classification of outermost stroke from said particular stroke to a different stroke when said different stroke is detected prior to said particular stroke in a scan subsequent to said particular scan, and means for determining the absolute locations of the remaining strokes in said character with respect to an absolute alphabet of characters based on the detection of the outermost stroke and the sequential labeling of all of the remaining strokes in said character.

5. The combination in accordance with claim 4 wherein said detector means generates a new stroke signal when a new stroke is detected in a scan and a track stroke signal when a previously detected stroke is redetected in a scan and wherein said classification means classifies the particular stroke from which the first new stroke signal is detected in the scan as the outermost stroke of said character in the absence of the prior generation of a track stroke signal in the same scan.

6. The combination in accordance with claim 4 wherein said scanner scans successive ones of said characters by a plurality of vertical scans, and said classification means classifies a newly detected stroke in a scan as the topmost stroke of the character in the absence of the prior detection of another stroke in said scan.

7. The combination in accordance with claim 5 wherein said reclassification means changes said classification whenever a track stroke signal is generated in a subsequent scan prior to the redetection of said particular stroke in said subsequent scan.

References Cited

UNITED STATES PATENTS

| | | | |
|---|---|---|---|
| 3,065,457 | 11/1962 | Bailey et al. | 340—146.3 |
| 3,142,818 | 7/1964 | Holt | 340—146.3 |
| 3,213,422 | 10/1965 | Fritze et al. | 340—146.3 |

DARYL W. COOK, *Acting Primary Examiner.*

MAYNARD R. WILBUR, *Examiner.*

J. SMITH, J. I. SCHNEIDER, *Assistant Examiners.*

UNITED STATES PATENT OFFICE
CERTIFICATE OF CORRECTION

Patent No. 3,349,372　　　　　　　　　　　　October 24, 1967

Harold B. Currie

It is hereby certified that error appears in the above numbered patent requiring correction and that the said Letters Patent should read as corrected below.

Column 16, line 70, for "means for turning off said reference signal subsequent" read -- means for utilizing said reference signal to gate a de- --; line 75, for "means for utilizing said reference signal to gate a de-" read -- means for turning off said reference signal subsequent --.

Signed and sealed this 12th day of November 1968.

(SEAL)
Attest:

Edward M. Fletcher, Jr.　　　　　　　　　　EDWARD J. BRENNER
Attesting Officer　　　　　　　　　　　　　Commissioner of Patents